(12) United States Patent
Borrowman et al.

(10) Patent No.: US 8,007,708 B2
(45) Date of Patent: Aug. 30, 2011

(54) APPARATUS AND METHODS FOR AUTOMATING MOVEMENT OF MOLD DRAWERS

(75) Inventors: Eric L. Borrowman, St. Peters, MO (US); Michael L. Timmer, Wright City, MO (US)

(73) Assignee: Innoventor Incorporated, St. Louis, MO (US)

( * ) Notice: Subject to any disclaimer, the term of this patent is extended or adjusted under 35 U.S.C. 154(b) by 67 days.

(21) Appl. No.: 12/635,786

(22) Filed: Dec. 11, 2009

(65) Prior Publication Data
US 2010/0151070 A1    Jun. 17, 2010

Related U.S. Application Data

(60) Provisional application No. 61/122,008, filed on Dec. 12, 2008.

(51) Int. Cl.
*B29C 45/80* (2006.01)

(52) U.S. Cl. .............. 264/405; 264/40.5; 264/328.7; 425/150; 425/169; 425/171; 425/185; 425/190

(58) Field of Classification Search .............. 425/150, 425/169, 171, 185, 190; 264/40.5, 405, 328.7
See application file for complete search history.

(56) References Cited

U.S. PATENT DOCUMENTS

| | | | |
|---|---|---|---|
| 4,462,783 A | 7/1984 | Hehl | |
| 4,472,127 A | 9/1984 | Cyriax | |
| 4,810,181 A * | 3/1989 | Ozawa | 425/190 |
| 4,810,182 A * | 3/1989 | Groll | 425/190 |
| 4,946,358 A | 8/1990 | Okuda et al. | |
| 5,217,727 A | 6/1993 | Kameyama et al. | |
| 5,445,774 A * | 8/1995 | Scribner | 264/40.5 |
| 5,992,208 A | 11/1999 | Hofele et al. | |
| 6,464,484 B1 * | 10/2002 | Powers et al. | 425/143 |
| 7,442,024 B2 | 10/2008 | La Forest et al. | |
| 7,789,648 B2 * | 9/2010 | Hein et al. | 425/190 |

* cited by examiner

Primary Examiner — Tim Heitbrink
(74) Attorney, Agent, or Firm — Armstrong Teasdale LLP

(57) ABSTRACT

An automated removal and insertion machine for mold drawers operable with a molding machine is described. The machine includes a frame, a plurality of actuators mounted within the frame, a plurality of encoders, a plurality of electromagnetic effectors, and a controller. The actuators are operable in a substantially horizontal direction for removal and insertion of molds with respect to the molding machine, and movable within the frame in a substantially vertical direction. At least one of the encoders is operably attached to each of the actuators for providing data indicative of a position of the respective said actuators. At least one electromagnetic effector is attached to a terminal end of each of the actuators for engagement with a respective mold. The controller is operable to control movement of the actuators in the substantially horizontal direction and further operable for controlling power applied to the electromagnetic effectors.

22 Claims, 4 Drawing Sheets

APPARATUS AND METHODS FOR AUTOMATING MOVEMENT OF MOLD DRAWERS

This application claims the benefit of U.S. Provisional Patent Application Ser. No. 61/122,008, filed Dec. 12, 2008, entitled "Mold Drawer Puller", the contents of which are incorporated by reference in their entirety.

BACKGROUND OF THE INVENTION

The field of the invention relates generally to molds, and more specifically, to the manipulation of mold drawers with respect to molding mechanisms including apparatus and methods for automating handling of mold drawers.

Molding mechanisms are utilized to produce molded parts which are not readily formed by injection molding processes. Material to be molded is first placed within a cavity in a mold drawer. The mold drawer is then placed within the mold mechanism (i.e., an electro-mechanical system capable of applying heat and pressure to the mold drawers) and the mechanism is closed and pressure and heat are applied to the mold drawer, thus forcing the material to fill the entire cavity within the mold drawer. Heat and pressure are maintained within the mold drawer until the material has sufficiently cured and filled the cavity. The mold drawers are then removed from the mold and the cured material is removed therefrom. In many molding mechanisms, the mold drawers must be manually placed within the mold mechanism and removed therefrom by an operator of the mechanism.

The production of large, molded parts in molding operations requires the use of correspondingly large mold drawers. Consequently, the mold drawers are heavy (i.e., weighing as much as 4,000 lbs.) and cumbersome, thus rendering their manipulation by operators difficult. While the mold drawers may be movable on tracks or other wheeled mechanisms, the operator is still required to impart the force necessary to move the mold drawers along the tracks.

The ergonomics of pushing and pulling large, heavy mold drawers by the operators subject the operators to repetitive-type injuries because of the force and awkwardness of the motions required to manipulate the mold drawers. Further, once the mold drawers begin moving on the tracks, the operator lacks the strength to sufficiently control or stop their movement. The uncontrolled movement of the mold drawers on the tracked or wheeled mechanisms raises safety concerns as well. Operators often pull the mold drawers quickly towards themselves and then release the mold drawers, thus permitting the mold drawers to freewheel into stops positioned at a terminal end of the tracks. Over time, the stops may fail and result in a catastrophic failure with the mold drawers coming off of their tracks and falling, often resulting in damage to equipment and injury of persons nearby.

Accordingly, a system is needed that requires only minimal modification of existing molding mechanisms, while significantly reducing or eliminating the amount of operator intervention required to place mold drawers within the molding machine and remove them from same.

BRIEF DESCRIPTION OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one aspect, an automated removal and insertion machine for mold drawers operable with a molding machine is provided. The machine includes a frame, a plurality of actuators mounted within the frame that are operable in a substantially horizontal direction for removal and insertion of molds with respect to the molding machine, the actuators being movable within the frame in a substantially vertical direction. The apparatus further includes a plurality of encoders, at least one encoder operably attached to each of the actuators for providing data indicative of a position of the respective actuators, a plurality of electromagnetic effectors, each electromagnetic effector is attached to a terminal end of a respective one of the actuators for engagement with a respective mold, and a controller operable to control movement of the actuators in the substantially horizontal direction. The controller is further operable for controlling power applied to the electromagnetic effectors, the controlled movement of the actuators and application of power to the electromagnetic effectors is operable for insertion and removal of at least one mold drawer with respect to the molding machine.

In another aspect, a method for automated movement of a mold drawer with respect to a molding machine is provided. The method includes positioning a drawer engaging device mounted within a frame in the vertical direction for substantial horizontal alignment with the mold drawer, extending an arm associated with the drawer engaging device in the substantial horizontal direction a first distance such that a terminal end of the arm is proximate the mold drawer, activating an electromagnetic effector attached to the terminal end of the arm to initiate and maintain a magnetic engagement between the terminal end and the mold drawer, retracting the arm a second distance, the second distance sufficient for removing the mold drawer from the molding machine, extending the arm the second distance to insert the mold drawer into the molding machine, and deactivating the electromagnetic effector.

In still another aspect, a system for positioning a mold with respect to a molding machine is provided. The system includes a frame having at least a bottom side and a vertical axis, an adjustment mechanism positioned within the frame that is substantially parallel to the vertical axis, and a plurality of hydraulic cylinders each having a terminal end, wherein the plurality of hydraulic cylinders are individually engaged with the adjustment mechanism within the frame in a substantially perpendicular orientation with respect thereto. The adjustment mechanism permits independent vertical positioning of each of the plurality of hydraulic cylinders with respect to the frame. The system also includes a corresponding plurality of electromagnetic effectors affixed to the terminal ends of each of the plurality of hydraulic cylinders. The plurality of corresponding electromagnetic effectors and the plurality of hydraulic cylinders are operable to independently engage one or more molds to cause lateral movement of the molds. The system further includes a plurality of anti-rotation rods having a distal end and a terminal end and positioned substantially parallel to each of the plurality of hydraulic cylinders. The terminal end of each of the plurality of anti-rotation rods is affixed to a portion of the electromagnetic effectors affixed to the terminal end of the hydraulic cylinder, wherein the distal end is connected to a portion of the frame.

DETAILED DESCRIPTION OF THE INVENTION

Figure 1:
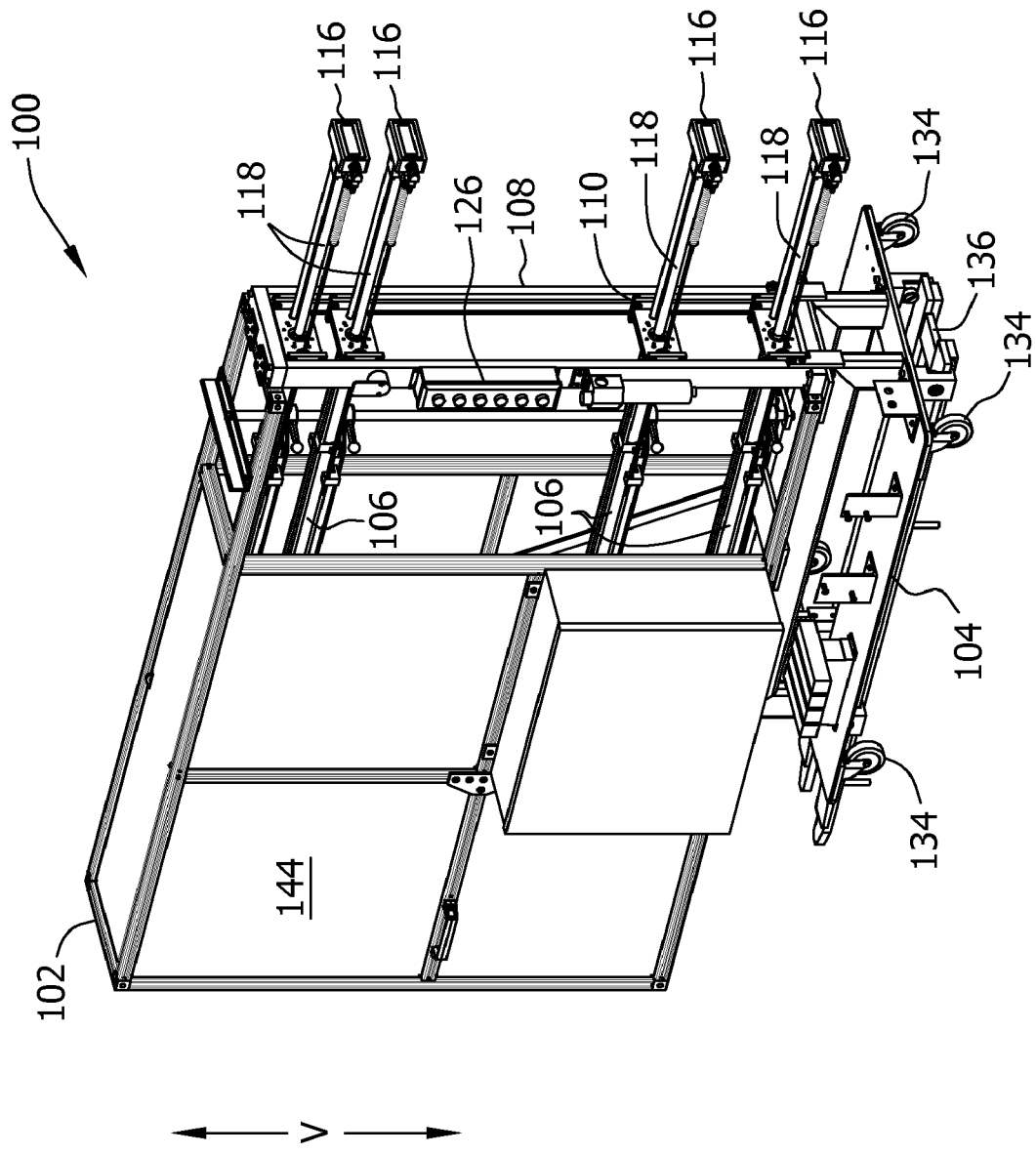
FIG. 1 is a perspective view of a mold drawer puller.

A mold drawer puller is depicted generally at 100 in FIG. 1. The mold drawer puller 100 includes a frame 102 having a bottom side and a vertical axis V. Included within the frame 102 are hydraulic cylinders 106, which are supported by a front bar 108. The front bar 108 has a cam and roller assembly 110 attached thereto that permit vertical translational movement of the hydraulic cylinders 106 along the vertical axis V and with respect to the front bar 108. The cam and roller assembly 110 prevents any other movements by the hydraulic cylinders 106. A back bar (not shown) may support the hydraulic cylinders 106 as well, according to some embodiments.

As utilized herein, a hydraulic cylinder refers to a device that includes a cylinder barrel, in which a piston connected to a piston rod moves back and forth. The cylinder barrel is closed on each end by the cylinder bottom and by the cylinder head where the piston rod comes out of the cylinder. The hydraulic pressure acts on the piston to do linear work and motion, moving the piston rod into and out of the cylinder barrel.

Figure 2:
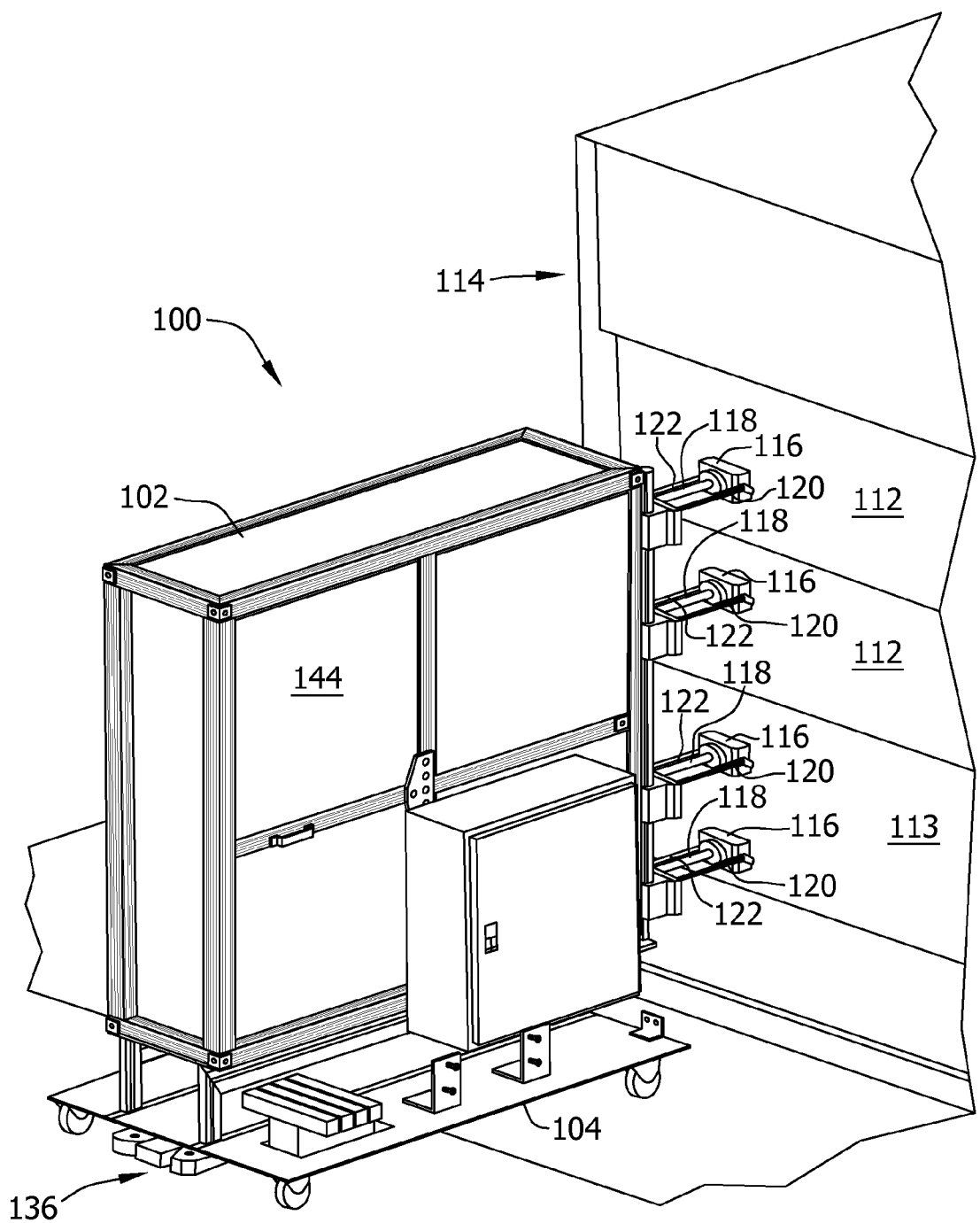
FIG. 2 is a perspective view of the mold drawer puller and a molding mechanism.

According to one embodiment, four hydraulic cylinders 106 and their associated piston rods 118 are provided, although any number of hydraulic cylinders 106 may be utilized, depending on the molding machine with which the mold drawer puller 100 is matched. In some embodiments, multiple mold drawers 112 (as seen in FIG. 2) may be used within a molding mechanism 114, with each mold drawer 112 having at least one corresponding hydraulic cylinder 106 and piston rod 118 responsible for its placement within the molding mechanism and removal therefrom. The hydraulic cylinders 106, piston rods 118, and the components associated therewith are sized based on the amount of force required to remove or pull the mold drawers 112 from the molding mechanism 114 and push them back into position therein. For larger mold drawers 113 (also shown in FIG. 2), multiple hydraulic cylinders 106 may be used in tandem, while for smaller mold drawers 112 a single hydraulic cylinder 106 and piston rod 118 may be used.

As shown in FIG. 2, in operation the mold drawer puller 100 is positioned generally adjacent to the molding mechanism 114. The mold drawer puller 100 is therefore operable to either pull the mold drawers 112, 113 to remove mold drawers from the molding mechanism 114, as well push the mold drawers 112, 113 into the molding mechanism. According to some embodiments, the molding mechanism 114 may be a compression molding mechanism. However, according to other embodiments it may be a different type of molding mechanism, such as an injection molding mechanism.

While specific mention is made herein to hydraulic actuation systems, other systems are contemplated as well. For example, pneumatic cylinders which operate piston rods or linear actuators and their associated extension devices may used instead of, or in conjunction therewith, hydraulic cylinders 106 to pull or remove the mold drawers 112 from the molding mechanism 114. Hydraulic cylinders, pneumatic cylinders and linear actuators may be collectively referred to herein as actuators.

Referring again to FIG. 1, a safety cage 144 is provided around the exterior of the mold drawer puller 100, according to some embodiments. The safety cage 144 prevents the operator or any other individual from coming into contact with the components of the mold drawer puller 100. The safety cage 144 may be removable to permit access to the components of the mold drawer puller 100.

Figure 4:
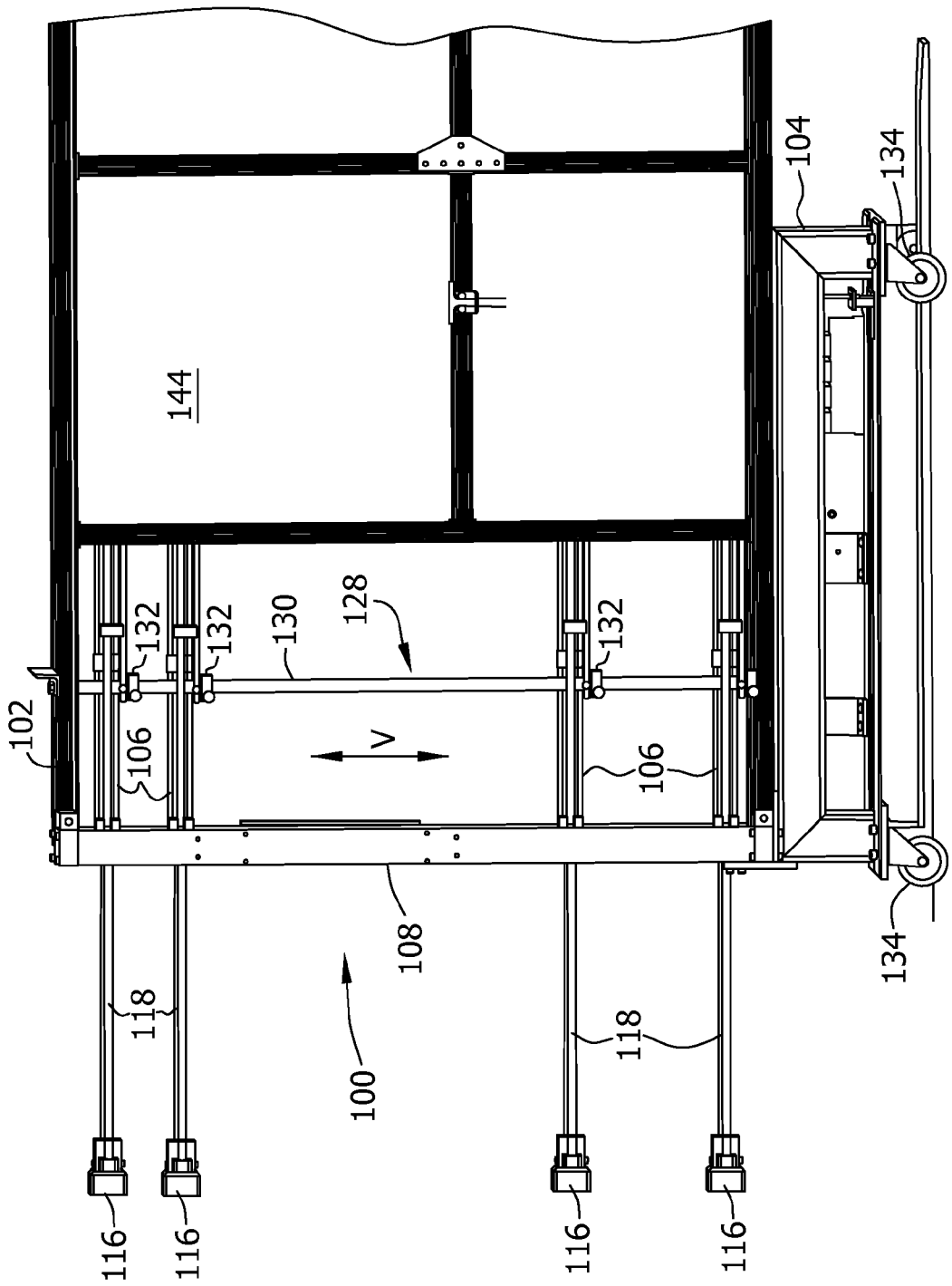
FIG. 4 is a side view of a portion of the mold drawer puller including an adjustment mechanism.

Referring to both FIGS. 1 and 4, electromagnetic effectors 116 are attached to a terminal end of piston rods 118 extending from the hydraulic cylinders 106. The electromagnetic effectors 116 assist in the engagement of mold drawers 112, 113 by the mold drawer puller 100. Upon the application of electrical current to the electromagnetic effectors 116, the effectors 116 become magnetized. As most, if not all, mold drawers 112, 113 are constructed using ferrous metals, the electromagnetic effectors 116 provide a releasable attachment mechanism between the mold drawer puller 100 and the mold drawers 112, 113. According to one embodiment, when removing mold drawers 112, 113 from within the molding mechanism 114, the electromagnetic effectors 116 are magnetized and come into contact with the mold drawers 112, 113. The hydraulic cylinders 106 are then retracted, and the mold drawer 112, 113 is pulled out of the molding mechanism 114, as the mold drawer 112, 113 is held adjacent to electromagnetic effectors 116 by magnetic forces. The same principle applies for placing mold drawers 112, 113 within the molding mechanism 114. In alternative embodiments, other types of effectors may be utilized to manipulate the mold drawers 112, 113 such as mating couplings, with one portion of the coupling affixed to the mold drawers 112, 113 and the other portion affixed to the terminal end of the rods 118 extending from the hydraulic cylinders 106.

Figure 3:
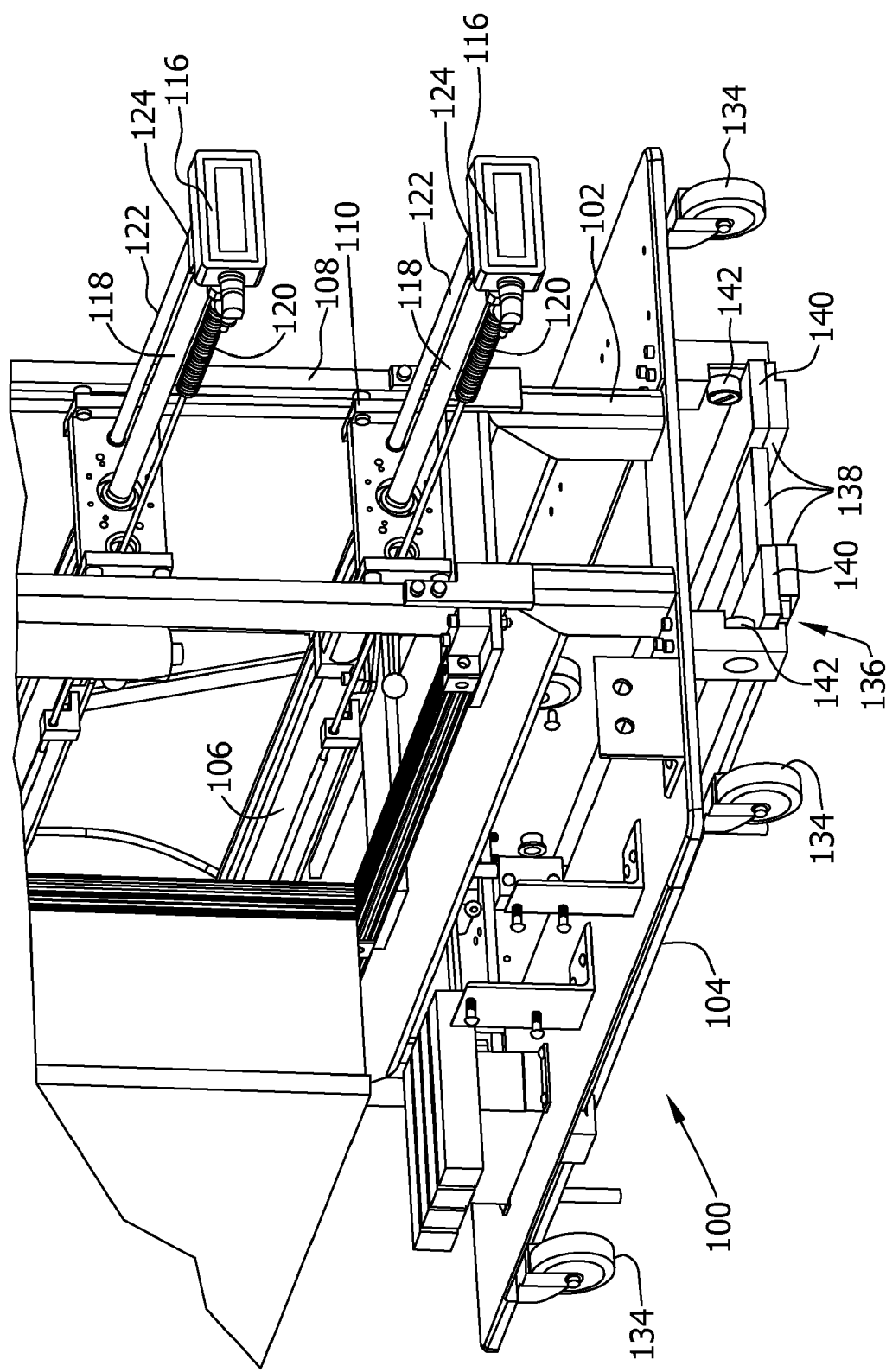
FIG. 3 is an enlarged perspective view of a portion of the mold drawer puller including a connection mechanism.

Now referring to FIG. 3, electrical current is supplied to the electromagnetic effectors 116 by a retractile cord 120 coiled around a support. The retractile cord 120 is thus prevented from coming into contact with any of the components of the mold drawer puller 100 or the mold drawers 112.

Anti-rotation rods 122 are provided to prevent the rod 118 extending from the hydraulic cylinders 106 (and the electromagnetic effectors 116 attached thereto) from rotating. At least one anti-rotation rod 122 is provided for each hydraulic cylinder 106. A terminal end of the anti-rotation rod 122 is attached to the electromagnetic effecter 116, while the opposite end of the anti-rotation rod 122 or a portion thereof is attached to the frame 102. The position of the electromagnetic effectors 116 and hence the rods 118 extending from the hydraulic cylinders 106 to which they are attached is determined by a string encoder 124 attached to the anti-rotation rods 122.

The rods 118 extending from the hydraulic cylinders 106 are retracted or extended based by closing proportional valves (not show) controlling the flow of hydraulic fluid to the hydraulic cylinders. The proportional valves may be controlled by an electro-mechanical control mechanism. The electrical-mechanical control mechanism may receive an input from the operator (i.e., press of a switch on a control pendant 126 shown in FIG. 1) indicating the operator's desire to move extend or retract the rods 118 to a predefined position. According to some embodiments, the operator may be required to use both hands to initiate movement of the hydraulic cylinders 106. This may be accomplished by spaced-apart controls that must synchronously actuated by the operator.

The electro-mechanical system then actuates the proportional valves to retract or extend the rods 118 to the desired position. The position of the rods 118 is determined by the string-encoders 124, and a feedback control system within the electro-mechanical system permits the accurate positioning of the rods with respect to the desired position. According to some embodiments, the hydraulic cylinders 106 may be actuated independently of each other, thus permitting the removal of specific mold drawers 112, 113 within the molding mechanism 114.

While a substantial portion of the weight of the mold drawer puller 100 is supported by wheels 134 or casters attached to the frame 102, a connection mechanism 136 is provided according to one embodiment. The frame of the mold drawer puller 100 is attached to an underlying structure (i.e., a floor) by the connection mechanism 136 (as best seen in FIG. 3). The connection mechanism 136 utilizes a floor plate 138 attached to the underlying structure. A track 140 is formed in the floor plate 138 or suitably attached thereto. Cam rollers 142 are attached to a structure on the bottom side 104 of the frame 102 and travel within the track 140. The track 140 suitably constrains the cam rollers 142 and permits the mold drawer puller 100 to travel transversely along the track, but otherwise restrain it from moving longitudinally or laterally. Accordingly, the connection mechanism 136 significantly reduces or eliminates the risk of the mold drawer puller 100 from tipping over, while ensuring its proper location.

Furthermore, corresponding sets of holes (not shown) may be formed in the bottom side 104 of the frame 102 and the floor plate 138. A rod or other rigid mechanism may be inserted through the corresponding sets of holes to securely lock the mold drawer puller 100 in position and prevent it from travelling transversely along the track 140. The rod may then be removed to allow the mold drawer puller 100 to be quickly removed to permit access to the molding mechanism 114. According to some embodiments, an automatic locking mechanism may be provided which inserts the rod through the corresponding holes without requiring the operator to do so. The insertion of the rod through the corresponding sets of holes formed in the bottom side 104 of the frame 102 stabilizes the mold drawer puller 100 in place, and thus provides a reaction force to counter force exerted by the actuation of the hydraulic cylinders 106.

The vertical position of the hydraulic cylinders 106 within the frame 102 may be adjusted by an adjustment mechanism 128, as best seen in FIG. 4. According to one embodiment, the adjustment mechanism 128 is comprised of a vertical screw 130, and a nut 132 corresponding to each hydraulic cylinder 106. The hydraulic cylinder 106 is rotatably engaged with its corresponding nut 132 or is placed atop the nut. Accordingly, the nut 132 may be rotated to displace it along the vertical screw 130. As the hydraulic cylinder 106 is attached to the nut 132 or resting thereon, any translation of the nut 132 necessarily results in corresponding translation of the hydraulic cylinder. In the embodiment depicted in FIG. 4, the vertical screw 130 is a rod with threads displaced thereon, while the nut 132 is an oversized wing nut which is sized to be easily rotated by an operator of the mold drawer puller 100. While the nut 132 and vertical screw 130 solution is easy to implement, embodiments which use hydraulics or pneumatics to move cylinders 106 up and down are also contemplated.

During setup of the mold drawer puller 100, the hydraulic cylinders 106 are vertically positioned with the aid of the adjustment mechanism 128 in order for the electromagnetic effectors 116 to be properly aligned with the mold drawers 112. The horizontal extension required of the hydraulic cylinders 106 and the rods 118 extending therefrom to extract or place the mold drawers 112 within the molding mechanism 114 is programmed into the electro-mechanical system by extending the hydraulic cylinders until each of them has contacted the individual mold drawers. The operator then presses a button on the control pendant 126 connected to the electro-mechanical system which records the current location of the hydraulic cylinders 106 (and hence the locations of the mold drawers 112) as provided by the string-encoders 124. When the operator subsequently commands the hydraulic cylinders 106 to retract, they will automatically stop at this location, turn on the electromagnetic effectors 116, and retract back out of the molding mechanism 114.

Proportional controls and extension feedback is used to limit the acceleration of the hydraulic cylinders 106. Without a soft stop of the hydraulic cylinders 106, the momentum of the mold drawers 112 may cause them to be detached from the electromagnetic effectors 116 and enable a freewheeling condition. A programmable logic controller (PLC) included within the electro-mechanical system takes feedback from the string-encoder 124 and feeds it into a proportional control algorithm that calculates how far to open the proportional valves to maintain safe speeds and accelerations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention may be susceptible to various modifications and alternative forms, specific embodiments have been shown by way of example in the figures and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a", "an", "the", and "said" are intended to mean that there are one or more of the elements. The terms "comprising", "including", and "having" are intended to be inclusive and mean that there may be additional elements other than the listed elements. Moreover, the use of "top", "bottom", "above", "below" and variations of these terms is made for convenience, but does not require any particular orientation of the components.

What is claimed is:

1. A method for automated movement of a mold drawer with respect to a molding machine, said method comprising:
    positioning a drawer engaging device mounted within a frame in the vertical direction for substantial horizontal alignment with the mold drawer;
    extending an arm associated with the drawer engaging device in the substantial horizontal direction a first distance such that a terminal end of the arm is proximate the mold drawer;
    activating an electromagnetic effector attached to the terminal end of the arm to initiate and maintain a magnetic engagement between the terminal end and the mold drawer;
    retracting the arm a second distance, the second distance sufficient for removing the mold drawer from the molding machine;
    extending the arm the second distance to insert the mold drawer back into the molding machine; and
    deactivating the electromagnetic effector.

2. The method according claim 1 wherein positioning a drawer engaging device mounted within a frame in the vertical direction comprises at least one of:
    operating a cam and roller assembly mounted within the frame to move an actuator within the frame in the substantially vertical direction;
    rotating a nut rotatably attached to an actuator about a vertical screw attached to the frame to move the actuator within the frame in the substantially vertical direction; and
    operating one of a hydraulic device, a pneumatic device and a linear actuating device to move the actuator within the frame in the substantially vertical direction.

3. The method according claim 1 wherein extending an arm associated with the drawer engaging device in the substantial horizontal direction comprises preventing rotation of the actuator and the associated electromagnetic effector using anti-rotation rods mounted proximate their first end to the frame and proximate their second ends to the terminal end of the respective actuator.

4. The method according claim 3 wherein extending the arm and retracting the arm comprises using a string encoder attached to a respective anti-rotation rod to determine a position of the actuator.

5. The method according claim 3 wherein extending the arm and retracting the arm comprises:
    limiting the acceleration of the actuator using a programmable logic controller programmed to take feedback from encoders; and
    inputting the feedback into a proportional control algorithm that calculates how far to open proportional controls to maintain safe operational speeds and accelerations for the actuators.

6. Automated removal and insertion machine for mold drawers operable with a molding machine, said machine comprising:
    a frame;
    a plurality of actuators mounted within said frame, said actuators retractable and extendible in a substantially horizontal direction for removal and insertion of molds with respect to the molding machine, said actuators movable within said frame in a substantially vertical direction;
    a plurality of encoders, each said encoder operably attached to a respective one of said actuators for providing data indicative of a position of the respective said actuator;
    a plurality of electromagnetic effectors, each said electromagnetic effector attached to a terminal end of a respective one of said actuators for engagement with a respective mold; and
    a controller communicatively coupled to said actuators to control retraction and extension of said actuators in the substantially horizontal direction and further communicatively coupled to said electromagnetic effectors for controlling power applied to said electromagnetic effectors, the controlled retraction and extension of said actuators and application of power to said electromagnetic effectors operable for insertion and removal of at least one mold drawer with respect to the molding machine.

7. The machine according to claim 6 further comprising a cam and roller assembly mounted within said frame, said cam and roller assembly operable for moving said actuators within said frame in the substantially vertical direction.

8. The machine according to claim 6 further comprising at least one bar within said frame configured to support said plurality of actuators.

9. The machine according to claim 6 wherein said actuators comprise at least one of hydraulic cylinders, pneumatic cylinders, and linear actuators.

10. The machine according to claim 6 further comprising a safety cage mounted about a perimeter of said frame.

11. The machine according to claim 6 further comprising a plurality of anti-rotation rods having a first end and a second, each anti-rotation rod mounted proximate the first end to said frame and proximate the second end to the terminal end of a respective said actuators, said anti-rotation rods mounted to prevent rotation of said actuators and the associated said electromagnetic effector.

12. The machine according to claim 11 wherein said encoders comprise string encoders, the strings of said encoders attached to a respective anti-rotation rod.

13. The machine according to claim 6 further comprising:
    a support member; and
    a retractile cord coiled around said support, electrical current supplied to said electromagnetic effectors by said retractile cord, said retractile cord prevented from coming into contact with other components of said apparatus or the mold drawers by said support member.

14. The machine according to claim 6 wherein said controller is operable for independently extending and retracting said plurality of actuators.

15. The machine according to claim 6 wherein said controller comprises hand controls configured for operation of said actuators and said electromagnetic effectors by an operator.

16. The machine according to claim 6 wherein said frame is supported by at least one of wheels and casters, said frame further configured for attachment to an underlying structure that is configured for attachment to a floor.

17. The machine according to claim 6 further comprising:
    a nut rotatably attached to each said actuators; and
    a vertical screw attached to said frame, rotation of said each said nut with respect to said vertical screw operable to adjust a vertical position of the respective said actuators.

18. The machine according to claim 6 further comprising at least one of hydraulic devices, pneumatic devices and linear actuating devices operable for vertically moving respective said actuators.

19. The machine according to claim 6 wherein said actuators comprise proportional controls, said controller comprising:

a plurality of inputs for receiving signals from said encoders, the signals representing a horizontal position of a respective said actuator; and a programmable logic controller (PLC) programmed with a proportional control algorithm, said PLC programmed to use the signals from said inputs to calculate how far to open said proportional controls to maintain a safe operational speed and acceleration for extension and retraction of said actuators as said actuators are extended or retracted from a first horizontal position to a second horizontal position.

20. A system for positioning a mold with respect to a molding machine, the system comprising:

a frame having at least a bottom side and a vertical axis;

an adjustment mechanism positioned within said frame, said adjustment mechanism substantially parallel to the vertical axis;

a plurality of hydraulic cylinders each having a terminal end, wherein said plurality of hydraulic cylinders are individually engaged with said adjustment mechanism within said frame in a substantially perpendicular orientation with respect thereto, wherein said adjustment mechanism permits independent vertical positioning of each of the plurality of hydraulic cylinders with respect to said frame;

a corresponding plurality of electromagnetic effectors affixed to the terminal ends of each of said plurality of hydraulic cylinders, wherein said plurality of corresponding electromagnetic effectors and said plurality of hydraulic cylinders are operable to independently engage one or more molds to cause lateral movement of the molds; and a plurality of anti-rotation rods having a distal end and a terminal end and positioned substantially parallel to each of the plurality of hydraulic cylinders, wherein the terminal end of each of the plurality of anti-rotation rods is affixed to a portion of the electromagnetic effectors affixed to the terminal end of the hydraulic cylinder, and wherein the distal end is connected to a portion of the frame.

21. The system of claim 20 further comprising a connection mechanism coupled to the bottom side of the frame, the connection mechanism including a plurality of cam rollers configured to mate to a corresponding rail affixed to an underlying surface, wherein the connection mechanism couples at least a portion of the bottom side of the frame to the underlying surface and preventing lateral and longitudinal movement of the frame while permitting transverse movement of the frame.

22. The system of claim 20 further comprising:

a plurality of encoders, each said encoder associated with a respective said hydraulic cylinder for determining an amount the cylinder is extended; and controls operable to limit an acceleration associated with operation of said cylinders; and a programmable logic controller (PLC) programmed to receive feedback from said encoders, input the feedback into a proportional control algorithm that provides output data to said controls, the output data controlling operation of said controls to maintain desired operational speeds and accelerations for said cylinders.

* * * * *